United States Patent
Rado et al.

(10) Patent No.: US 7,015,433 B2
(45) Date of Patent: Mar. 21, 2006

(54) TEMPERATURE CALIBRATION METHOD FOR A COOKING APPLIANCE

(75) Inventors: David Rado, Middlebury, CT (US); Steve Brennan, Farmington, CT (US)

(73) Assignee: Technology Licensing Corporation, Fort Lauderdale, FL (US)

( * ) Notice: Subject to any disclaimer, the term of this patent is extended or adjusted under 35 U.S.C. 154(b) by 0 days.

(21) Appl. No.: 10/890,611

(22) Filed: Jul. 14, 2004

(65) Prior Publication Data

US 2006/0011613 A1    Jan. 19, 2006

(51) Int. Cl.
*H05B 1/02* (2006.01)

(52) U.S. Cl. .................. 219/494; 219/497; 219/505; 374/1

(58) Field of Classification Search ........ 319/411–414, 319/494, 497, 499, 501, 506, 505, 390, 443.1; 374/1, 102, 137, 2; 307/117
See application file for complete search history.

(56) References Cited

U.S. PATENT DOCUMENTS

| | | | | | |
|---|---|---|---|---|---|
| 4,228,511 A | * | 10/1980 | Simcoe et al. | ............... | 700/278 |
| 4,369,352 A | * | 1/1983 | Bowles | ........................ | 219/413 |
| 5,341,360 A | * | 8/1994 | Johann et al. | ............ | 369/47.53 |
| 6,813,575 B1 | * | 11/2004 | Laflamme | ..................... | 702/99 |
| 2003/0197005 A1 | * | 10/2003 | Huegerich et al. | .......... | 219/494 |

* cited by examiner

*Primary Examiner*—Mark Paschall
(74) *Attorney, Agent, or Firm*—Howard M. Gitten; Edwards & Angell, LLP

(57) ABSTRACT

The present invention is a method for calibrating the temperature of a cooking appliance. It has been discovered that the calibration can vary widely, depending on when during the heating cycle it is performed. In accordance with the principles of the invention, temperature calibration is judiciously performed only when the sensed temperature substantially tracks the actual or calibration temperature of the cooking medium, increasing both accuracy and consistency. Such tracking has been found to occur after the sensed temperature is falling or rising form a detected peak or valley, respectively, while the gradient of the temperature profile is substantially constant.

20 Claims, 3 Drawing Sheets

TEMPERATURE CALIBRATION METHOD FOR A COOKING APPLIANCE

TECHNICAL FIELD

Figure 1:
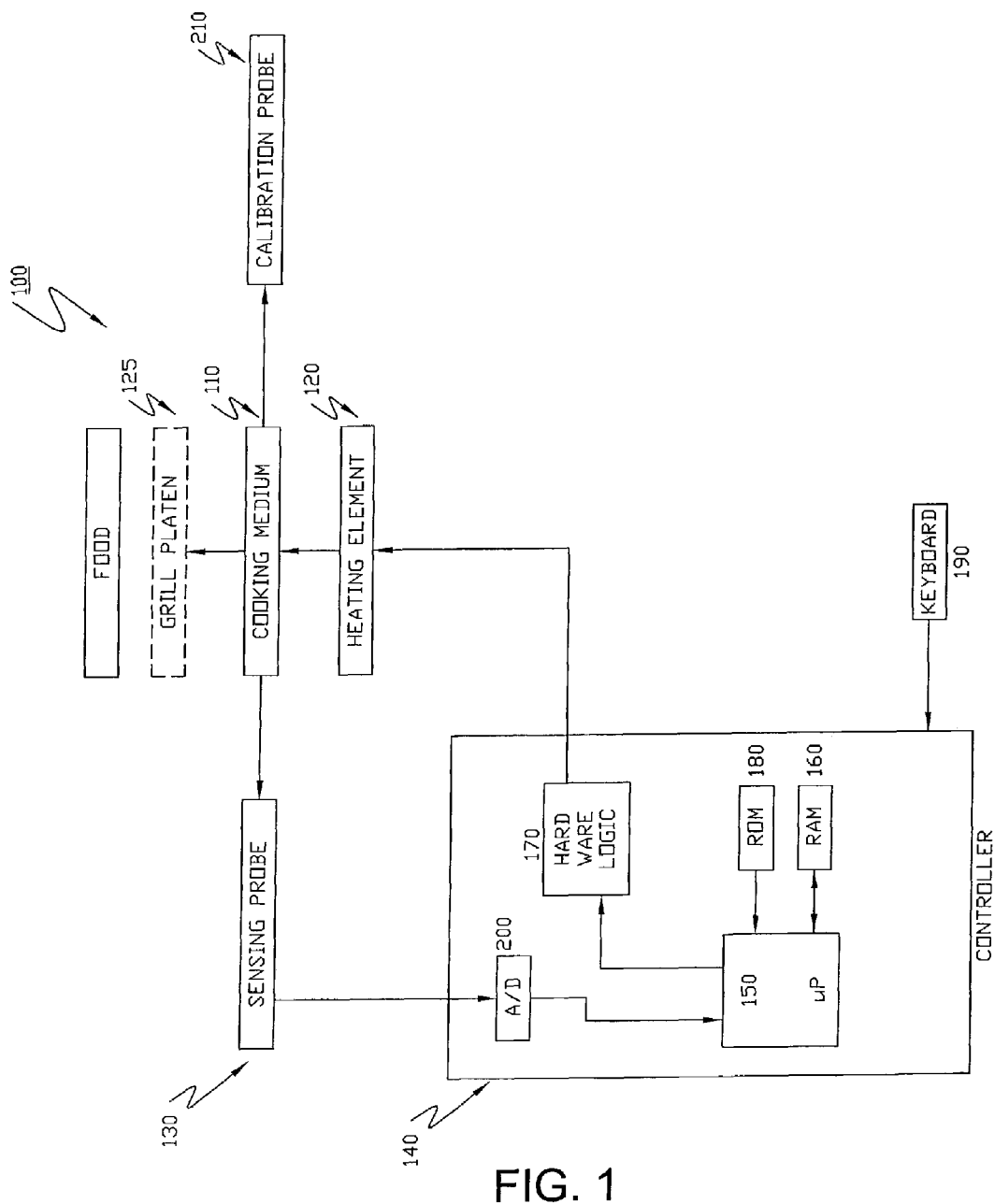

The present invention relates generally to cooking appliances and, more particularly to the temperature calibration of cooking appliances.

BACKGROUND OF THE INVENTION

Microprocessor based controllers have been developed in recent years to assist in the preparation of properly cooked foods. Under program control, the electronic controller regulates the various operations of the cooking appliance during a cooking cycle, including the temperature of the cooking medium or grill platen, so as to insure properly cooked food. Today's cooking appliances require somewhat sophisticated electronic controllers to keep the cooking temperature at a desired temperature or the so-called "set point," with as little overshoot as possible. To do so, however, the cooking appliance is calibrated so that the indicated temperature accurately corresponds to the actual temperature of the cooking medium, or the grill platen. Over time, changes in the appliance, such as in the temperature sensing probe or the electronics, or changes in the operating environment, will affect the temperature calibration, and hence the performance of the cooking appliance. Whatever the cause, it is apparent that the cooking appliance will need to be re-calibrated at some point, and more likely on a periodical basis, even daily.

To perform a calibration, an operator or service agent uses an external, temperature calibration probe, such as a thermocouple, to measure the actual temperature of the cooking medium, or grill platen. Even after calibration, it is still not uncommon for the actual temperature of the cooking medium or the grill platen to differ as much as 5–10° F. from that indicated by its internal temperature sensing probe.

SUMMARY OF THE INVENTION

The present invention is a method for calibrating the temperature of a cooking appliance. It has been discovered that the calibration can vary widely, depending on when during the heating cycle it is performed. In accordance with the principles of the invention, temperature calibration is judiciously performed only when the sensed temperature substantially tracks the actual ("calibration") temperature of the cooking medium, increasing both accuracy and consistency. Such tracking has been found to occur after the sensed temperature falls or rises from a detected peak or valley, respectively. During that latter time, the gradient of the temperature profile of the sensed temperature appears to be substantially constant.

In one embodiment, the temperature profile of the cooking medium is monitored with a temperature sensing probe. After the sensed temperature is falling or rising, from a detected peak or valley, respectively, the gradient of the temperature profile is calculated as a function of time. This is done by determining the differential change in temperature during a small time interval. If the temperature gradient is substantially constant, an appropriate signal—either audible or visual—is then displayed to an operator, indicating that a calibration can be performed. Calibration is performed by the placing a temperature calibration probe at different locations in the cooking medium or on the grill platen, reading the displayed temperatures, and then entering the read temperatures into the cooking appliance. The average read temperature is compared against that from the sensing probe, and the sensing probe accordingly calibrated.

BRIEF DESCRIPTION OF THE INVENTION

A more complete understanding of the invention may be obtained by reading the following description in conjunction with the appended drawings in which like elements are labeled similarly, and in which:

FIG. 1 is a schematic block diagram of a cooking appliance incorporating the calibration method of the present method; and FIG. 2 depicts exemplary temperature profiles for the temperature sensing and calibration probes.

DETAILED DESCRIPTION

The present invention is directed to a method for calibrating the temperature of a cooking appliance having an electronic controller for maintaining the cooking temperature at a desired set point. It has been discovered that temperature calibration can vary widely, depending on when during the heating cycle it is performed. In accordance with the principles of the invention, temperature calibration is judiciously performed only when the sensed temperature substantially tracks the actual temperature of the cooking medium or grill platen, increasing both accuracy and consistency. Such tracking has been found to occur after the temperature is falling or rising from a detected peak or valley, respectively while the gradient of the temperature profile is substantially constant. Performing a calibration at other times could cause gross errors in the calibration.

Without any loss of generality or applicability for the principles of the invention, the description herein below is directed to a generic cooking appliance. It should be clearly understood that this generic cooking appliance includes deep fryers, ovens, grills, and the like.

Referring now to the drawings, and particularly to FIG. 1, there is shown a cooking appliance 100 having a cooking medium 110 through which thermal energy produced from a heating element 120 passes to the food. Cooking appliance 100 uses air, water, and the like as the cooking medium. In the case of a grill, however, the thermal energy passes through a grill platen 125 on top of which the food is placed for cooking. The temperature of the cooking medium (or grill platen) is measured by a temperature sensing probe 130 located in cooking medium 110, or embedded in grill platen 125 near the heating element, respectively. Temperature sensing probe 130 is arranged in a feedback configuration with an electronic controller 140 for regulating the temperature of cooking appliance 100. Controller 140 compares the sensed temperature, $T_s$, of the cooking medium or grill platen with the desired cooking temperature, $T_{set}$, or so-called "set point," turning on or off heating element 120 to maintain the "set point." Depending on the type of cooking appliance, heating element 120 may be located at different positions, and is either of an electrical or gas nature, or a combination thereof.

More specifically, during normal operation, controller 140 regulates the percentage of time heating element 120 is turned on in accordance with the cooking parameters selected by the user. For example, heating element 120 may be pulsed with either a fixed or variable duty cycle (proportional control heating), may be fully turned on, or operated in on/off manner similar to a thermostat, depending on the heating mode of the cooking appliance. Such techniques minimize overshoot and recovery time. The particular technique selected depends, for example, on how rapidly the set point needs to be reached, and the amount of acceptable overshoot. The particular technique used, however, is not critical to the operation of the present invention inasmuch as the invention may be used with any or all of these techniques.

Controller 140 uses a microprocessor 150 having random access memory (RAM) 160 and hardware logic 170 to provide the calibration function of the present invention, as well as to program the appliance to operate with the cooking parameters tailored for a specific food product. The present cooking appliance operates in accordance with a calibration program whose methodology of operation is set forth below herein. The calibration program can be stored in conventional read only memory 180 or in a pre-programmed chip, such as EPROM or EEPROM. It is contemplated, however, that the calibration program may be activated or calibration data input into the cooking appliance through keypad 190.

Sensing probe 130 is connected to an analog-to-digital (A/D) converter 200 that supplies digital signals to microprocessor 150 indicative of the sensed temperature, $T_s$, of cooking medium 110, or grill platen 125. Sensing probe 130 may be resistance temperature detectors, thermistors, thermocouples, and the like. The choice of temperature sensor depends on the range of the temperatures to be measured, and the type of cooking medium used in the cooking appliance. Microprocessor 150 processes the digital temperature signals using software program and data stored in read-only memory 180 in a manner well known in the art.

Figure 2A:
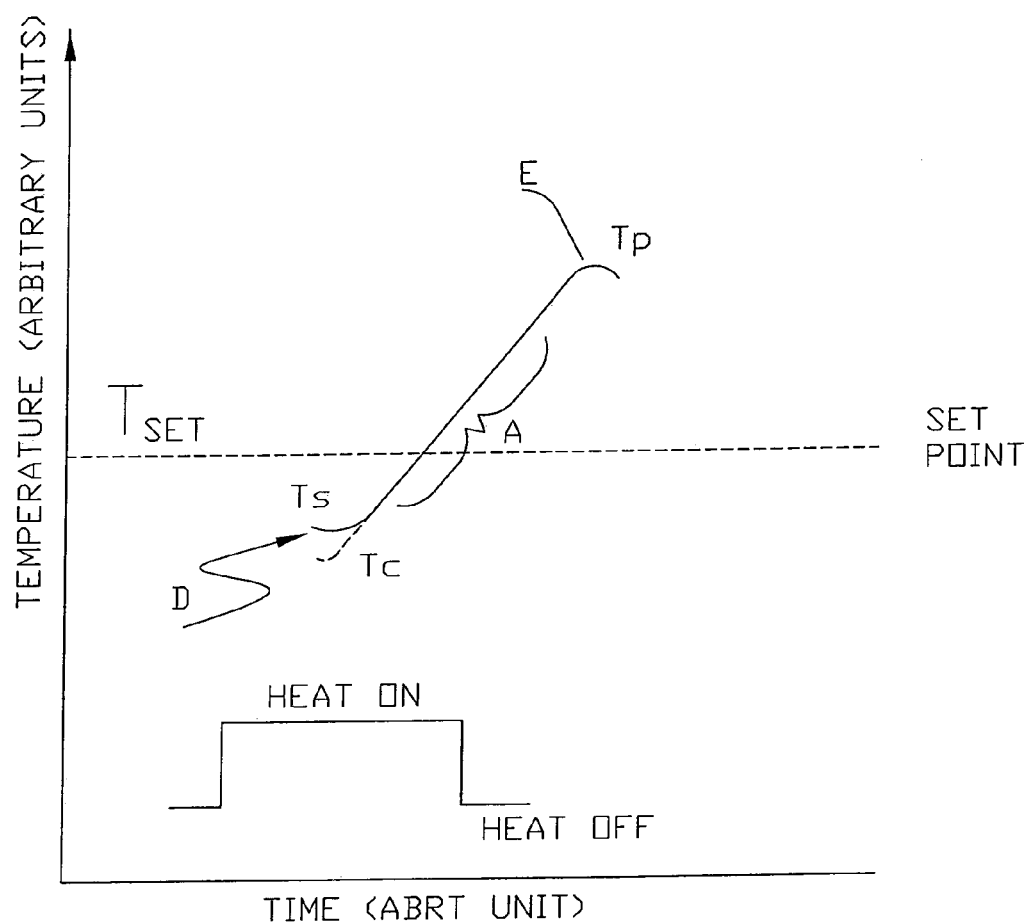
Figure 2B:
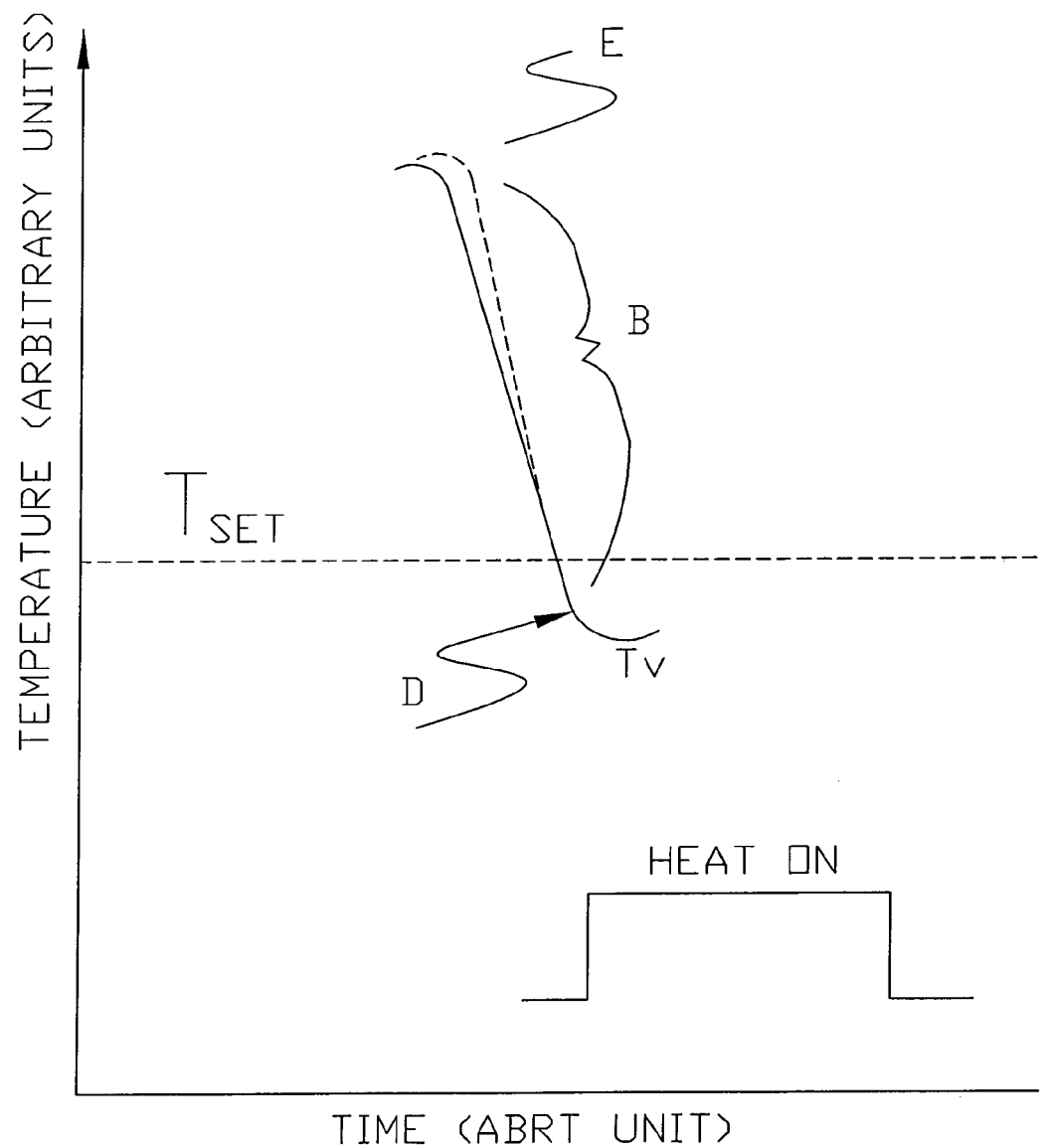

Shown in FIGS. 2A and 2B are exemplary graphs of the temperature profile of the sensed temperature, $T_s$ from sensing probe 130 as controller 140 regulates the temperature of the cooking medium at the set point, $T_{set}$, by turning on and off heating element 120. Referring to FIG. 2A, note that after the heating element is turned on, the sensed temperature, $T_s$, rises an amount of time after the heat has been applied. Also, thermal inertia causes the temperature to rise to a peak temperature, $T_p$, even after heating element 120 has been turned off, overshooting the set point, $T_{set}$. Now referring to FIG. 2B, Once the heat is removed from the cooking medium, the sensed temperature, $T_s$, begins to fall. Again, thermal inertia causes the temperature to fall below the set point, $T_{set}$, to a valley temperature, $T_v$. The peak, $T_p$, and the valley $T_v$ are inflexions in the temperature profile of the sensed temperature.

To perform a calibration, an operator or service agent uses an external, temperature calibration probe 210, such as a thermocouple, to measure the actual temperature of cooking medium 110, or grill platen 125. This actual temperature is called the calibration temperature, $T_c$. Also shown in FIGS. 2(A)–(B) are exemplary graphs of the temperature profile of the calibration temperature, $T_c$, from calibration probe 210 superimposed over the temperature profile for the sensed temperature, $T_s$. Due to the thermo-conductive characteristics of the cooking appliance, the calibration temperature, $T_c$, (shown in dashed lines) initially lags the sensed temperature, $T_s$. When heat is initially applied, the thermal energy produced passes first from the heating element to the cooking medium or grill platen. As the thermal energy passes, thermal masses closer to the heating element will reach the desired set point before those located farther away due to this time lag, as well as due to radiative heat losses. As such, the indicated sensed temperature, $T_s$, from sensing probe 130 typically rises much quicker than the calibration temperature, $T_c$, from calibration probe 210, but the two then generally track one another once the thermodynamics reach equilibrium.

Conversely, if the heat is turned off, thermal masses closer to the heating element will initially cool faster. Again, because temperature sensing probe 130 is located closer to the heating element than calibration probe 210, and as well as due to radiative heat loss, the calibration temperature, $T_c$, lags in time, with the calibration probe reading higher than the sensing probe, as shown in FIG. 2B. But, again the two temperatures will then typically track each other an amount of time later.

As such, only during certain time intervals during the heating cycles do the two temperatures track each other. Looking at the exemplary temperature profiles of FIGS. 2A and 2B, only during time intervals A and B after the temperature is rising or falling from a detected peak or valley, respectively, is the temperature gradient (slope) substantially constant. At this latter time, the calibration temperature, $T_c$, is correlated as a first approximation to the sensed temperature, $T_s$, as follows, where C is a constant.

$$T_c \approx T_s + C$$

It should be understood that if the cooking appliance is perfectly calibrated then C is zero. Near the inflexions, D and E, of the temperature profiles, however, the sensed and calibration temperatures vary non-linearly from one another, due largely to the time lag between them, and radiative heat loss.

In accordance with the principles of the invention, temperature calibration is judiciously performed only during the heating cycles when sensed temperature $T_s$ substantially tracks the calibration temperature, $T_c$. Such tracking has been discovered to occur after the sensed temperature is falling or rising from a peak or valley, respectively, while the gradient of the sensed temperature profile is substantially constant. Accordingly, controller 140 monitors the sensed temperature profile from from sensing probe 130. After detecting a peak or valley (an inflexion) in the temperature profile of the sensed temperature profile, and as the sensed temperature is falling or rising, respectively, controller 140 calculates as a function of time the gradient of the temperature. This is done by determining the differential change in the sensed temperature, $T_{s2} - T_{s1}$, for a small time interval, $\Delta t = t_2 - t_1$, where $T_{s1}$ is the sensed temperature a time $t_1$, and $T_{s2}$ is the sensed temperature at the later time $t_2$. Inasmuch as the controller is already regulating the amount, and the manner in which power is applied to the heating element, it is relatively straight forward to measure the temperature gradient, $T_{s2}-T_{s1}/\Delta t$, regardless of the manner in which heating element 120 is controlled.

Those skilled in the art will readily note that the time $\Delta t$, may be tracked through the use of software counters. The quantity, $T_{s2}-T_{s1}/\Delta t$, is the first order thermal gradient, with $\Delta t$ typically a few milliseconds. If the temperature gradient is substantially constant, an appropriate signal—either audible or visual—can be displayed to the operator, indicating that a calibration can be performed. Calibration is performed by the placing calibration probe 210 at different locations in cooking medium 110 or on grill platen 125, reading the displayed temperatures, and then entering the read temperatures into controller 140 through keypad 190. Controller 140 compares the average read temperature against that from sensing probe 130. Using the relationship from the above equation, controller 140 calculates the offset, C, between the two temperatures. For readings then on, the temperature measured by sensing probe 130 is then adjusted by this offset, C, thereby calibrating the cooking appliance.

In results from experimental practice using the Clam Shell Grill manufactured by Garland Inc., the temperature calibration method of the present invention was initiated during the system setup portion of the programming mode of electronic controller 140, Fastron Model 231-60131-01 manufactured by Food Automation Service Techniques, Stamford Conn. With the desired cooking temperature set for 350° F., the controller then monitored the temperature profile of sensing probe 130 of the cooking appliance, which sensing probe was embedded in the grill platen close to heating element 120. After the sensed temperature is falling or rising, respectively, from a detected peak or valley, respectively, the calibration program calculates as a function of time the gradient of the temperature profile. In order to ensure that there was sufficient time for an operator to perform the calibration, it was observed that it was best to perform the calibration as the temperature was falling from a peak temperature of 360° F., or higher. Also, the temperature gradient appears to become substantially constant only after dropping about 2–3° F. from a detected peak temperature, indicating that the calibration temperature and the sensed temperature were tracking each other. Moreover, it was observed that temperature calibration should not be performed when the heating element was turned on for more than 30 seconds. In this latter case, the sensed temperature, although rising, did not have a constant temperature gradient.

It should be understood that the embodiment herein is merely illustrative of the principles of the invention. Various modifications, may be made by those skilled in the art which will embody the principles of the invention and fall within the spirit and scope thereof.

What is claimed is:

1. A method of calibrating a cooking appliance comprising the steps of:
   obtaining the profile of the sensed temperature $T_s$ of the cooking medium or grill platen measured by the cooking appliance;
   determining when the sensed temperature $T_s$ of the cooking medium or grill platen substantially tracks the actual temperature of the cooking medium or grill platen; and
   during the time that the sensed temperature $T_s$ tracks the actual temperature of the cooking medium or grill platen, measuring the actual or calibration temperature $T_c$ of the cooking medium or grill platen using an external calibration probe so as to calibrate the sensed temperature measured by the cooking appliance.

2. The method of claim 1 wherein the step of performing a calibration includes placing a calibration probe at different locations in the cooking medium or on the grill platen and averaging the read temperatures.

3. The method of claim 2 wherein the actual or calibration temperature $T_c$ as a first approximation is given by $T_c=T_s+C$, where C is a constant, and the step of performing a calibration includes determining the value of the constant C.

4. The method of claim 1 wherein the sensed temperature $T_s$ of the cooking medium or grill platen substantially tracks the calibration temperature $T_c$ after the sensed temperature is falling or rising from a detected peak or valley, respectively, in the temperature profile of the sensed temperature $T_s$.

5. The method of claim 4 wherein the sensed temperature $T_s$ substantially tracks the calibration temperature $T_c$ while the gradient of the temperature profile for the sensed temperature $T_s$ is substantially constant.

6. The method of claim 5 wherein the gradient is given by $T_{s2}-T_{s1}/t_2-t_1$, where $T_{s1}$ is the sensed temperature at a time $t_1$, and $T_{s2}$ is the sensed temperature at a later time $t_2$.

7. The method of claim 1 wherein the calibration temperature $T_c$ is given by $$T_c \approx T_s + C$$

where C is a constant.

8. The method of claim 1 further comprising the step of notifying an operator either audibly or visually when the sensed temperature $T_s$ substantially tracks the calibration temperature $T_c$ of the cooking medium or grill platen.

9. A method for calibrating a cooking appliance comprising the steps of:
   obtaining the profile of the sensed temperature $T_s$ of the cooking medium or grill platen measured by the cooking appliance; and
   measuring the actual or calibration temperature $T_c$ of the cooking medium or grill platen using an external calibration probe after the sensed temperature is falling or rising from a detected peak or valley, respectively, while the gradient of the temperature profile for the sensed temperature $T_s$ is substantially constant.

10. The method of claim 9 wherein the step of performing a calibration includes placing a calibration probe at different locations in the cooking medium or on the grill platen and averaging the read temperatures.

11. The method of claim 9 wherein the calibration temperature $T_c$ as a first approximation is given by $T_c=T_s+C$, where C is a constant, and the step of performing a calibration includes determining the value of the constant C.

12. The method of claim 9 wherein the gradient is given by $T_{s2}-T_{s1}/t_2-t_1$, where $T_{s1}$ is the sensed temperature at a time $t_1$, and $T_{s2}$ is the sensed temperature at a later time $t_2$.

13. The method of claim 9 wherein the actual or calibration temperature $T_c$ is given by $$T_c \approx T_s + C$$

where C is a constant.

14. The method of claim 9 further comprising the step of notifying an operator either audibly or visually when the gradient of the sensed temperature $T_s$ is substantially constant.

15. A method for calibrating a cooking appliance having an electronic controller that regulates the cooking temperature of the cooking appliance by using a sensing probe that measures the temperature of the cooking medium or grill platen, and then turns on or off a heating element to maintain the cooking temperature at the desired cooking temperature, said method comprising the steps of:

obtaining the profile of the sensed temperature $T_s$ of the cooking appliance using the sensing probe;

after the sensed temperature is falling or rising from a detected peak or valley, respectively, measuring the gradient of the sensed temperature $T_s$;

if the gradient is substantially constant, measuring the actual or calibration temperature $T_c$ of the cooking medium using an external calibration probe; and adjusting the sensed temperature $T_s$ of the sensing probe on the basis of the calibration temperature $T_c$ so as to thereby perform a calibration.

16. The method of claim 15 wherein the step of measuring the actual or calibration temperature $T_c$ of the cooking medium using an external calibration probe includes placing the calibration probe at different locations in the cooking medium or on the grill platen and then averaging the read temperatures.

17. The method of claim 15 wherein the actual or calibration temperature $T_c$ as a first approximation is given by $T_c = T_s + C$, where C is a constant, and the step of adjusting the sensed temperature $T_s$ includes determining the value of the constant C.

18. The method of claim 15 wherein the gradient is given by $T_{s2} - T_{s1}/t_2 - t_1$ where $T_{s1}$ is the sensed temperature at a time $t_1$, and $T_{s2}$ is the sensed temperature at a later time $t_2$.

19. The method of claim 15 wherein the actual or calibration temperature $T_c$ is given by $$T_c \approx T_s + C$$

where C is a constant.

20. The method of claim 15 further comprising the step of notifying an operator either audibly or visually when the gradient of the sensed temperature $T_s$ is substantially constant.

* * * * *